United States Patent
Bennett

(10) Patent No.: US 6,850,383 B1
(45) Date of Patent: Feb. 1, 2005

(54) DISK DRIVE COMPRISING CURRENT SENSE CIRCUITRY FOR A VOICE COIL MOTOR

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 145 days.

(21) Appl. No.: 10/376,819

(22) Filed: Feb. 28, 2003

(51) Int. Cl.$^7$ .......................... G11B 21/02; G11B 5/596
(52) U.S. Cl. .................... 360/75; 360/78.04; 360/78.01
(58) Field of Search ................... 360/46, 67, 78.01, 360/78.04, 75, 77.02; 318/293, 256, 280, 560, 565, 568.16

(56) References Cited

U.S. PATENT DOCUMENTS

| | | |
|---|---|---|
| 4,160,216 A | 7/1979 | Thornton |
| 5,838,515 A | 11/1998 | Mortazavi et al. |
| 5,877,914 A | 3/1999 | Gontowski, Jr. |
| 6,084,378 A | 7/2000 | Carobolante |
| 6,094,020 A | 7/2000 | Goretzki et al. |

Primary Examiner—Sinh Tran
Assistant Examiner—Jason Olson
(74) Attorney, Agent, or Firm—Milad G. Shara, Esq.; Won Tae C. Kim, Esq.; Howard H. Sheerin, Esq.

(57) ABSTRACT

A disk drive is disclosed comprising a voice coil motor (VCM) for actuating a head radially over a disk. A VCM driver comprises first and second transistors forming a common collector amplifier for sensing a current flowing through a voice coil of the VCM. The common collector amplifier improves the accuracy of the current sense measurement when the VCM is driven in a pulse width modulated (PWM) mode.

8 Claims, 8 Drawing Sheets

DISK DRIVE COMPRISING CURRENT SENSE CIRCUITRY FOR A VOICE COIL MOTOR

CROSS REFERENCE TO RELATED APPLICATIONS AND PATENTS

This application is related to co-pending U.S. Patent Application Ser. No. 10/376,821 entitled "DISK DRIVE COMPRISING OSCILLATORS AND COUNTERS FOR SENSING CURRENT IN A VOICE COIL MOTOR" filed on Feb. 28, 2003, the disclosure of which is incorporated herein by reference.

BACKGROUND OF THE INVENTION

1. Field of the Invention

The present invention relates to disk drives for computer systems. More particularly, the present invention relates to a disk drive comprising current sense circuitry for a voice coil motor (VCM).

2. Description of the Prior Art

FIG. 1 shows a prior art disk drive comprising a disk 2 rotated about a center axis by a spindle motor (not shown). A head 4 attached to a distal end of an actuator arm 6 is actuated radially over the disk 2 by a voice coil motor (VCM) 8. The VCM 8 comprises a voice coil 10 which interacts with permanent magnets of a VCM yoke in order to rotate the actuator arm 6 about a pivot. The VCM 8 is typically driven in either a linear mode or in a pulse width modulated (PWM) mode. In addition, the motion of the VCM 8 may be controlled using a current feedback loop by sensing the amount of current flowing through the voice coil 10 which is proportional to the amount of torque applied to the actuator arm 6.

FIG. 1 also shows a VCM driver 12 comprising a conventional H-bridge driver for driving the voice coil 10 shown as a resistance Rvcm 14 and an inductance Lvcm 16. The H-bridge driver comprises a plurality of driver switches 18A–18D for selectively connecting the ends of the voice coil 10 to a supply voltage 20 or to ground 22 depending on the desired direction of rotation. A plurality of diodes D1–D4 protect the driver switches 18A–18D from flyback currents generated from driving an inductive load.

In order to control the motion of the VCM 8 accurately using a current feedback loop it is important to measure the total integral of the current flowing through the voice coil 10. Several problems arise when attempting to use the conventional techniques for sensing the current flowing through the voice coil 10 when driven in a PWM mode. Referring again to FIG. 1, if a single sense resistor Rsense 24 in series with the voice coil 10 is used to sense current, the PWM voltage appears on both sides of the resistor Rsense 24 at several volts at very high slew rates. This chop voltage (a square wave) must be rejected by sense amplifier 31 so that the very small voltage across Rsense 24 can be accurately measured. This high frequency AC voltage capacitively couples into the sense amplifier 31, and creates offsets and nonlinearities which distort the current sense measurement. This problem exacerbates as the frequency of the PWM increases.

Another prior art current sensing technique uses a sense resistor Rsensep 26 in series with the supply voltage 20 and an amplifier 28, or a sense resistor Rsensem 30 in series with ground 22 and an amplifier 32. This technique avoids the common mode voltage problem associated with sense resistor Rseries 24, however, it also leads to other problems related to inductive flyback currents. Assume, for example, that current is flowing to the right through the voice coil 10. Initially, driver switches 18A and 18D are on, allowing Vpwr 20 to source the current through the sense resistors Rsensep 26 or Rsensem 30. Driver switch 18A is driven by a PWM signal, while driver switch 18D is left on continually. When the PWM signal turns driver switch 18A off, the inductive load keeps current flowing to the right in the coil regardless of the voltage applied because of the magnetic flux stored in the coil and its magnetic structure. This inductive current can cause diode D2 or driver switch 18B to conduct current, depending on the ratio of impedances. Since current is also flowing through switch 18D, the flyback current momentarily cancels the current through sense resistor Rsensem 30, which can distort the current sense measurement by creating a blank spot in the voltage waveform. Additionally, if the two halves of the H-bridge are switched alternately, flyback current from the inductive current can drive the voltage at the top of sense resistor Rsensem 30 below ground. When this happens, substrate parasitic transistors (shown as parasitic transistor 31 in FIG. 1) are activated, drawing current from elsewhere in the driver circuitry in a random manner, both distorting the current measurement with this additional current and disrupting operation of the driver circuitry.

Regardless of how the H-bridge PWM switching is timed, shootthrough currents (caused by a brief simultaneous conduction between driver switches 18A and 18B or driver switches 18C and 18D) or gate charge injections can also create false values for current that distort the true measurement. These problems are generally avoided using sample/hold circuits 34 and 36, which sample the voltage across the resistors 26 and 30 at a point in the PWM chop cycle where distortions due to flyback, shootthrough, switching, or diode conduction, do not occur. However, the sampling process adds delay to the loop. Additionally, an abrupt change from a large current to a small current leaves a time related sample distortion in the waveform that can be larger than the actual voltage value corresponding to the small current. The control system spends time responding to these spurious distortions which cause unwanted motion in the VCM. Still further, the sense amplifiers 28 and 32 must be designed such that their inputs can be driven below ground, or above the power supply, respectively, in order to sense current of all polarities. Sensing current above or below the power supply rails significantly increases the circuit complexity of a monolithic IC sense amplifier due to substrate current injection, which also removes current from the sense resistor in a nonlinear manner.

There is, therefore, a need to accurately sense the current flowing through the voice coil of disk drive VCM in order to implement a current feedback loop while driving the VCM in a PWM mode.

SUMMARY OF THE INVENTION

The present invention may be regarded as a disk drive comprising a disk, an actuator arm, a head connected to a distal end of the actuator arm, a voice coil motor (VCM) comprising a voice coil, the VCM for rotating the actuator arm about a pivot to actuate the head radially over the disk, and a VCM driver. The VCM driver comprises an H-bridge driver comprising a plurality of driver switches for driving current from a supply voltage through the voice coil to ground. A first sense resistor is connected in series between the supply voltage and at least one of the driver switches, and a second sense resistor is connected in series between at least one of the driver switches and ground. The VCM driver further comprises a first transistor having a first transistor terminal, a second transistor terminal, and a gate terminal, and a second transistor having a first transistor terminal, a second transistor terminal, and a gate terminal. A third sense resistor has a first end connected to a node between the first sense resistor and the at least one of the driver switches and a second end connected to the first transistor terminal of the first transistor. A fourth sense resistor has a first end connected to a node between the second sense resistor and the at least one of the driver switches and a second end connected to the first transistor terminal of the second transistor. A first gain resistor has a first end connected to at least the second transistor terminal of the first transistor, and a second end connected to a reference voltage. When the gate terminals of the first and second transistors are forward biased, a voltage across the gain resistor represents the current flowing through the voice coil.

In one embodiment, the VCM driver further comprises a current source for generating a current flowing through the first transistor, for example by connecting a resistor between the supply voltage and the first transistor terminal of the first transistor. In another embodiment, the VCM driver further comprises a current source for generating a current flowing through the second transistor, for example by connecting a resistor between the first transistor terminal of the second transistor and ground.

In one embodiment, the first and second transistors are bipolar junction transistors, and in an alternative embodiment, the first and second transistors are field effect transistors.

In yet another embodiment, the VCM driver further comprises a second gain resistor having a first end connected to the second transistor terminal of the second transistor, and a second end connected to the reference voltage. When the gate terminals of the first and second transistors are forward biased a voltage across the second gain resistor represents the current flowing through the voice coil.

DESCRIPTION OF THE PREFERRED EMBODIMENTS

Figure 1:
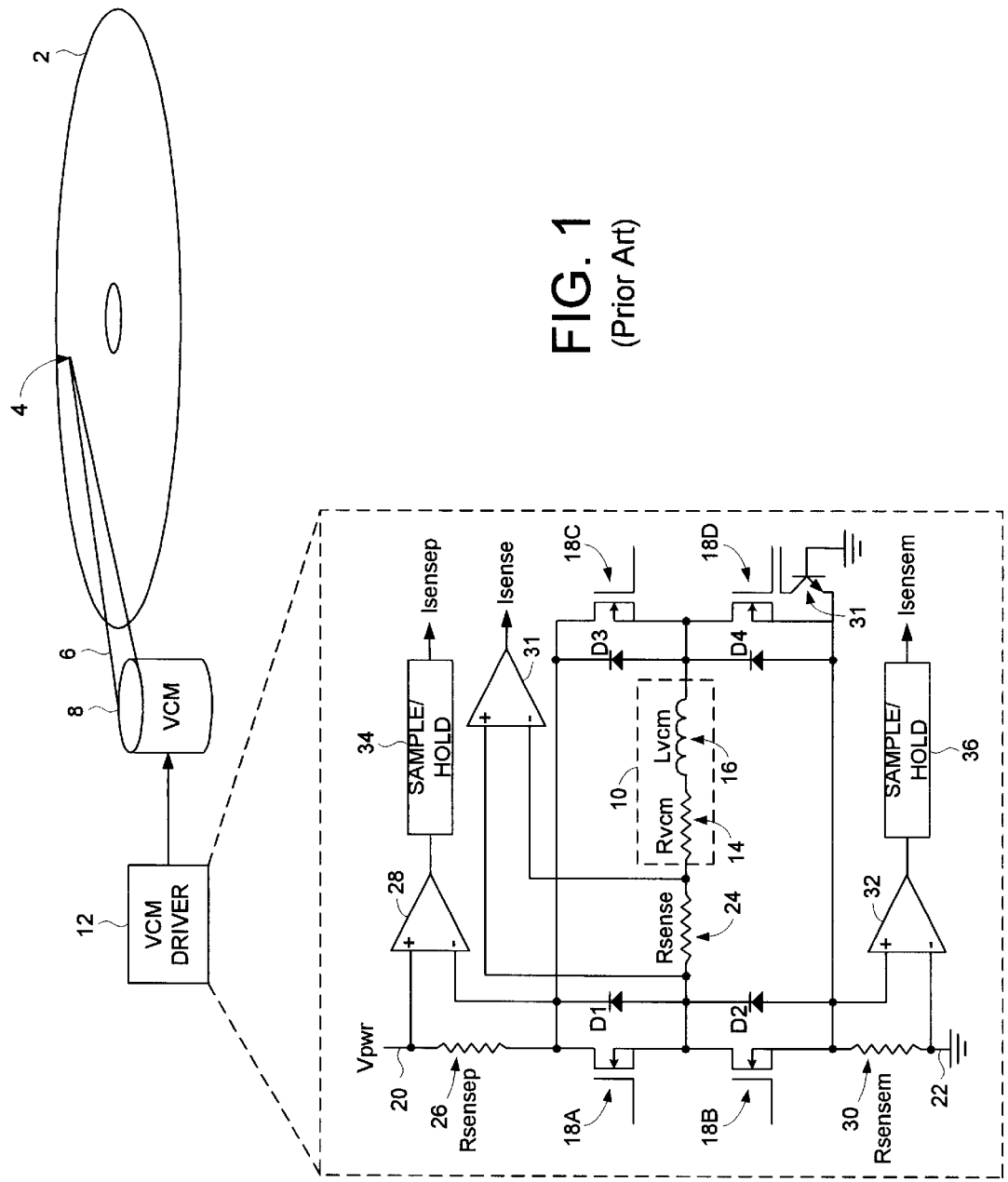
FIG. 1 shows prior art techniques for sensing the current flowing through the voice coil of a disk drive VCM.
Figure 2A:
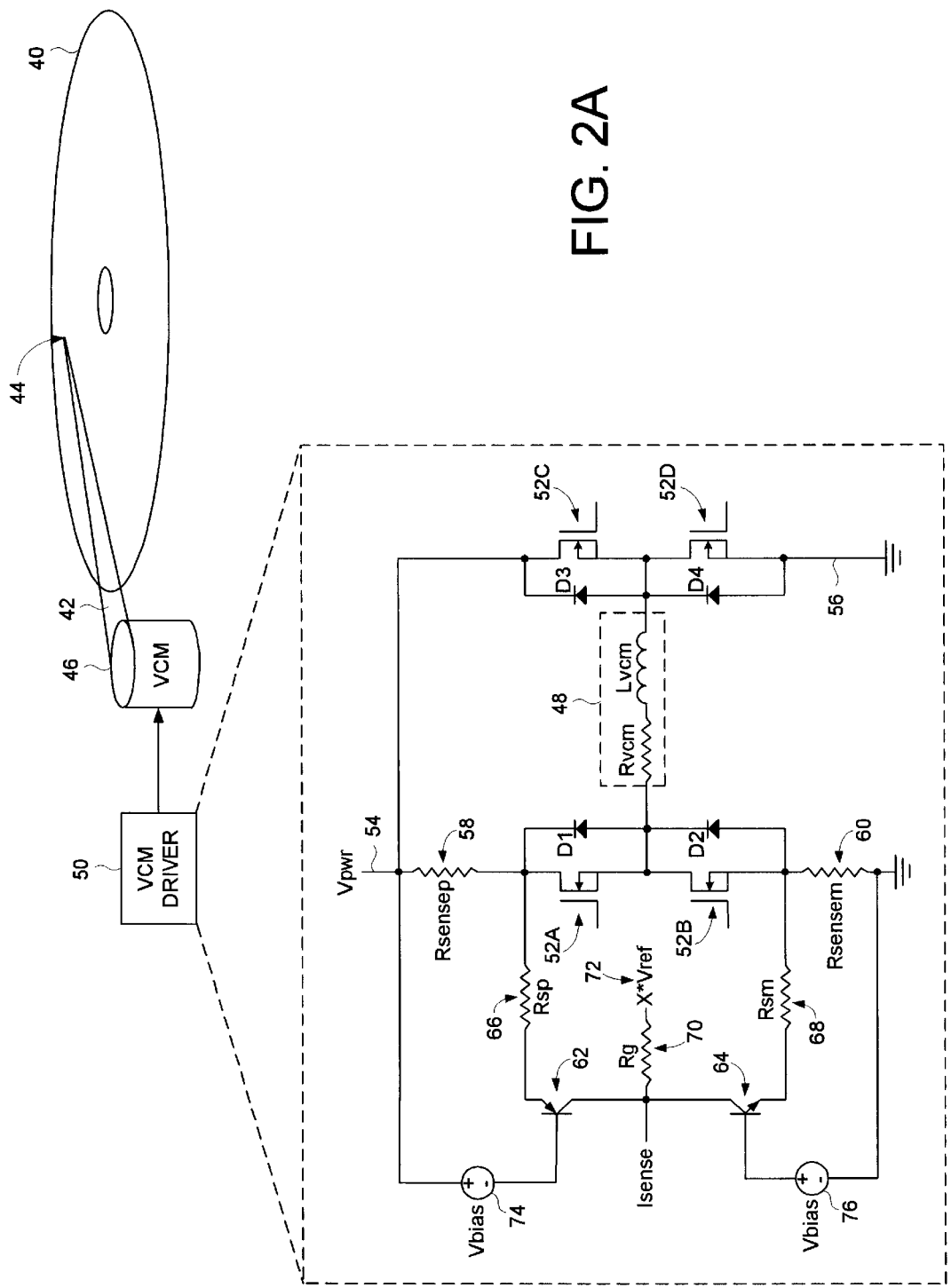
FIG. 2A shows a disk drive according to an embodiment of the present invention comprising a VCM driver employing first and second transistors forming a common collector amplifier for sensing the current flowing through the voice coil of the VCM.

FIG. 2A shows a disk drive according to an embodiment of the present invention comprising a disk 40, an actuator arm 42, a head 44 connected to a distal end of the actuator arm 42, a voice coil motor (VCM) 46 comprising a voice coil 48, the VCM 46 for rotating the actuator arm 42 about a pivot to actuate the head 44 radially over the disk 40. A VCM driver 50 comprises an H-bridge driver having a plurality of driver switches 52A–52D for driving current from a supply voltage 54 through the voice coil 48 to ground 56. A first sense resistor Rsensep 58 is connected in series between the supply voltage 54 and at least one of the driver switches 52A–52D, and a second sense resistor Rsensem 60 is connected in series between at least one of the driver switches 52A–52D and ground 56. The VCM driver 50 further comprises a first transistor 62 having a first transistor terminal, a second transistor terminal, and a gate terminal, and a second transistor 64 having a first transistor terminal, a second transistor terminal, and a gate terminal. A third sense resistor Rsp 66 has a first end connected to a node between the first sense resistor Rsensep 58 and the at least one of the driver switches 52A–52D and a second end connected to the first transistor terminal of the first transistor 62. A fourth sense resistor Rsm 68 has a first end connected to a node between the second sense resistor Rsensem 60 and the at least one of the driver switches 52A–52D and a second end connected to the first transistor terminal of the second transistor 64. A gain resistor Rg 70 has a first end connected to at least the second transistor terminal of the first transistor 62, and a second end connected to a reference voltage X*Vref 72. When the gate terminals of the first and second transistors 62 and 64 are forward biased (by bias voltage Vbias 74 and 76), a voltage across the gain resistor Rg 70 represents the current flowing through the voice coil 48.

The bias voltage Vbias 74 and 76 sets the amount of bias current flowing through sense resistor Rsp 66 and sense resistor Rsm 68. Since the currents through sense resistors Rsp 66 and Rsm 68 are substantially matched through the biasing arrangement, this bias current generates insignificant voltage on Rg 70.

The supply voltage 54 may be supplied by any suitable source, such as from a host computer or generated internally during a power failure using the back EMF voltage of the spindle motor (not shown).

When driving the VCM 46 in a particular direction (e.g., moving the head 44 from the inner diameter toward the outer diameter of disk 40), a PWM signal (not shown) turns on driver switches 52A and 52D. Current flowing from the supply voltage 54 through the voice coil 48 to ground 56 generates a voltage drop across sense resistor Rsensep 58 which reduces the voltage across sense resistor Rsp 66 and therefore reduces the amount of current flowing through transistor 62. Since the current flowing through transistor 64 does not change, the gain resistor Rg 70 sources the difference in current from the reference voltage X*Vref 72 and the voltage developed across the gain resistor Rg 70 represents the current flowing through the voice coil 48. When the PWM signal turns off driver switches 52A and 52D and turns on driver switch 52B and 52C, current is forced by the inductance to flow from ground, through sense resistor Rsensem 60, through driver switch 52B, through the voice coil 48, through driver switch 52C to the supply voltage 54. This flow generates a voltage drop below ground across sense resistor Rsensem 60 which increases the voltage across sense resistor Rsm 68 and therefore increases the amount of current flowing through transistor 64. Since the current flowing through transistor 62 does not change, the gain resistor Rg 70 sources the difference in current from the reference voltage X*Vref 72 and the voltage developed across the gain resistor Rg 70 again represents the current flowing through the voice coil 48.

When driving the VCM 46 in the opposite direction (e.g., moving the head 44 from the outer diameter toward the inner diameter of disk 40), the PWM signal turns on driver switches 52C and 52B. Current flowing from the supply voltage 54 through the voice coil 48 to ground 56 generates a voltage across sense resistor Rsensem 60 which reduces the voltage across sense resistor Rsm 68 and therefore reduces the amount of current flowing through transistor 64. Since the current flowing through transistor 62 does not change, the gain resistor Rg 70 sinks the difference in current and the voltage developed across the gain resistor Rg 70 represents the current flowing through the voice coil 48. When the PWM signal turns off driver switches 52C and 52B and turns on driver switch 52A and 52D, current is forced by the inductance to flow from ground, through driver switch 52D, through the voice coil 48, through driver switch 52A, through sense resistor Rsensep 58 to the supply voltage 54. This flow generates a voltage rise above the supply voltage 54 across sense resistor Rsensep 58 which increases the voltage across sense resistor Rsp 66 and therefore increases the amount of current flowing through transistor 62. Since the current flowing through transistor 64 does not change, the gain resistor Rg 70 sinks the difference in current and the voltage developed across the gain resistor Rg 70 again represents the current flowing through the voice coil 48.

If driver switches 52A and 52B momentarily cross conduct, a current spike flows through sense resistor Rsensep 58 and sense resistor Rsensem 60. Since the current is identical in both sense resistors, and the resulting voltage spike generated across sense resistor Rsensep 58 and sense resistor Rsensem 60 is opposite in sign, sense resistor Rsp 66 and sense resistor Rsm 68 cause an identical change in current through transistors 62 and 64. The result is a net zero change in the voltage across the gain resistor Rg 70, and consequently the circuit rejects common mode currents, bias currents, and any current flowing through both sense resistors identically. The extent that the circuitry rejects common mode depends on the match between the various parts of the circuitry. This embodiment therefore generates an accurate voltage representation of the current regardless of the state of the driver switches 52A–52D or the direction the current is flowing through the voice coil 48, and suppresses secondary currents generated in the circuitry that do not actually flow through the voice coil 48.

Figure 2B:
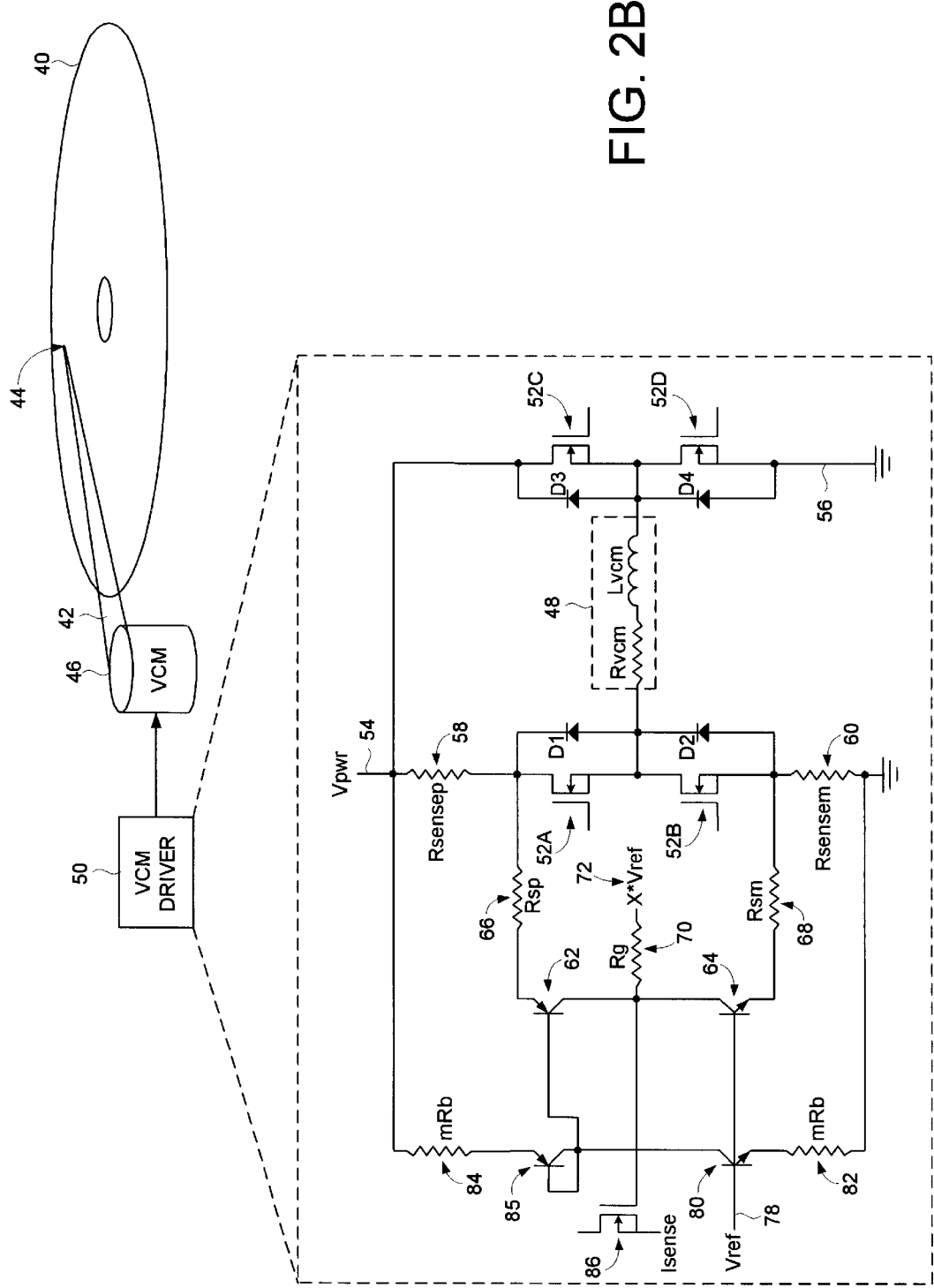
FIG. 2B shows an embodiment for generating the bias voltages for the first and second transistors of FIG. 2A.

FIG. 2B shows an embodiment of the present invention for generating the bias voltage Vbias 74 and 76 (FIG. 2A) applied to the gates of transistors 62 and 64. A reference voltage vRef 78 is applied as the bias voltage 76 for transistor 64. The reference voltage vRef 78 is also applied to transistor 80 to generate the bias voltage across resistors 82 and 84. The voltage across resistor 84 is the bias voltage Vbias 74 for transistor 62. A field effect transistor (MOSFET) 86 is used to buffer the voltage across the gain resistor Rg 70 representing the current flowing through the voice coil 48. This buffer arrangement is very simple, fast, and very high impedance at its input.

Figure 3A:
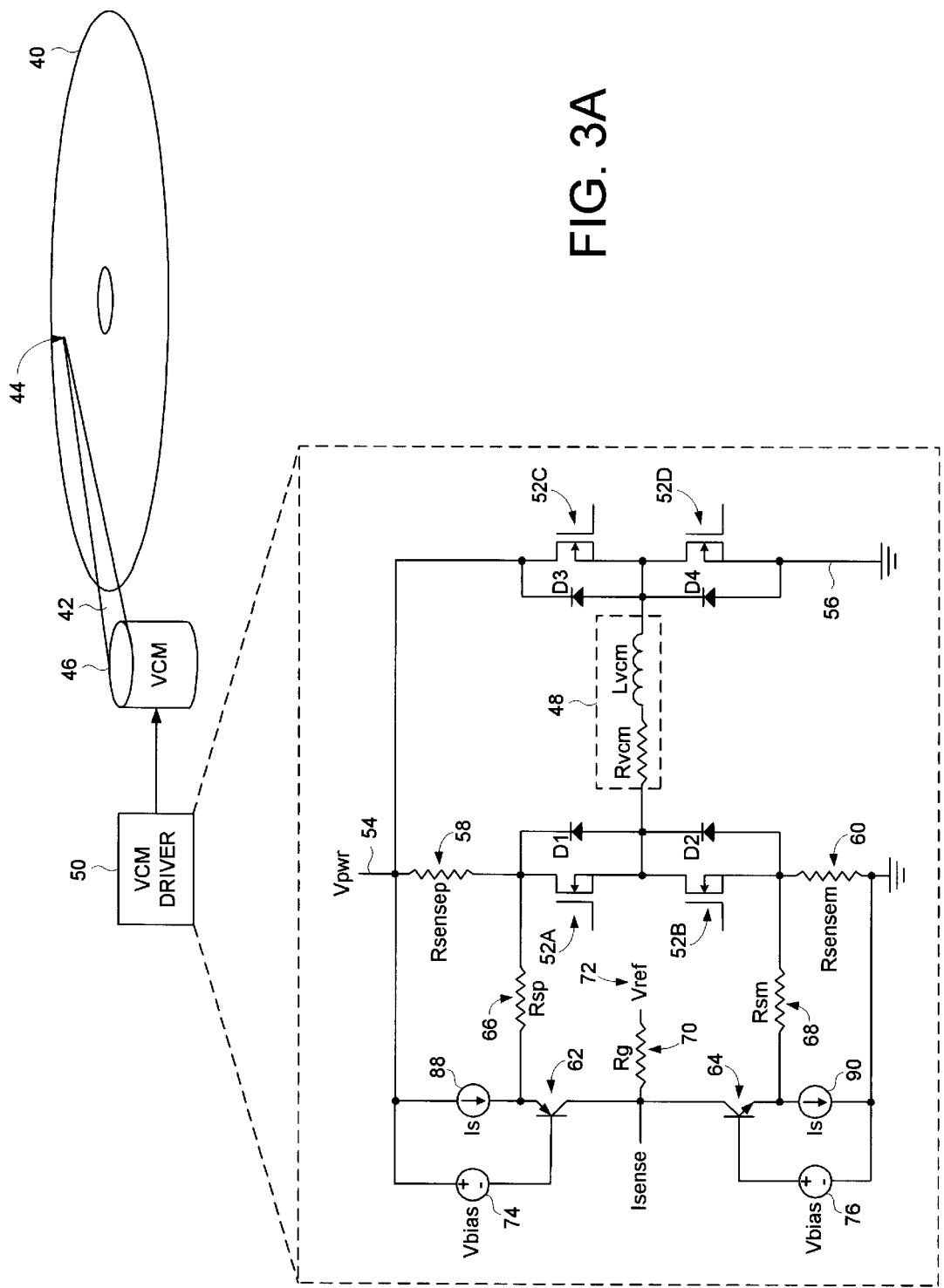
FIG. 3A shows a disk drive according to an embodiment of the present invention wherein the VCM driver further comprises first and second current sources for optimizing the operating mode of the first and second transistors.
Figure 3B:
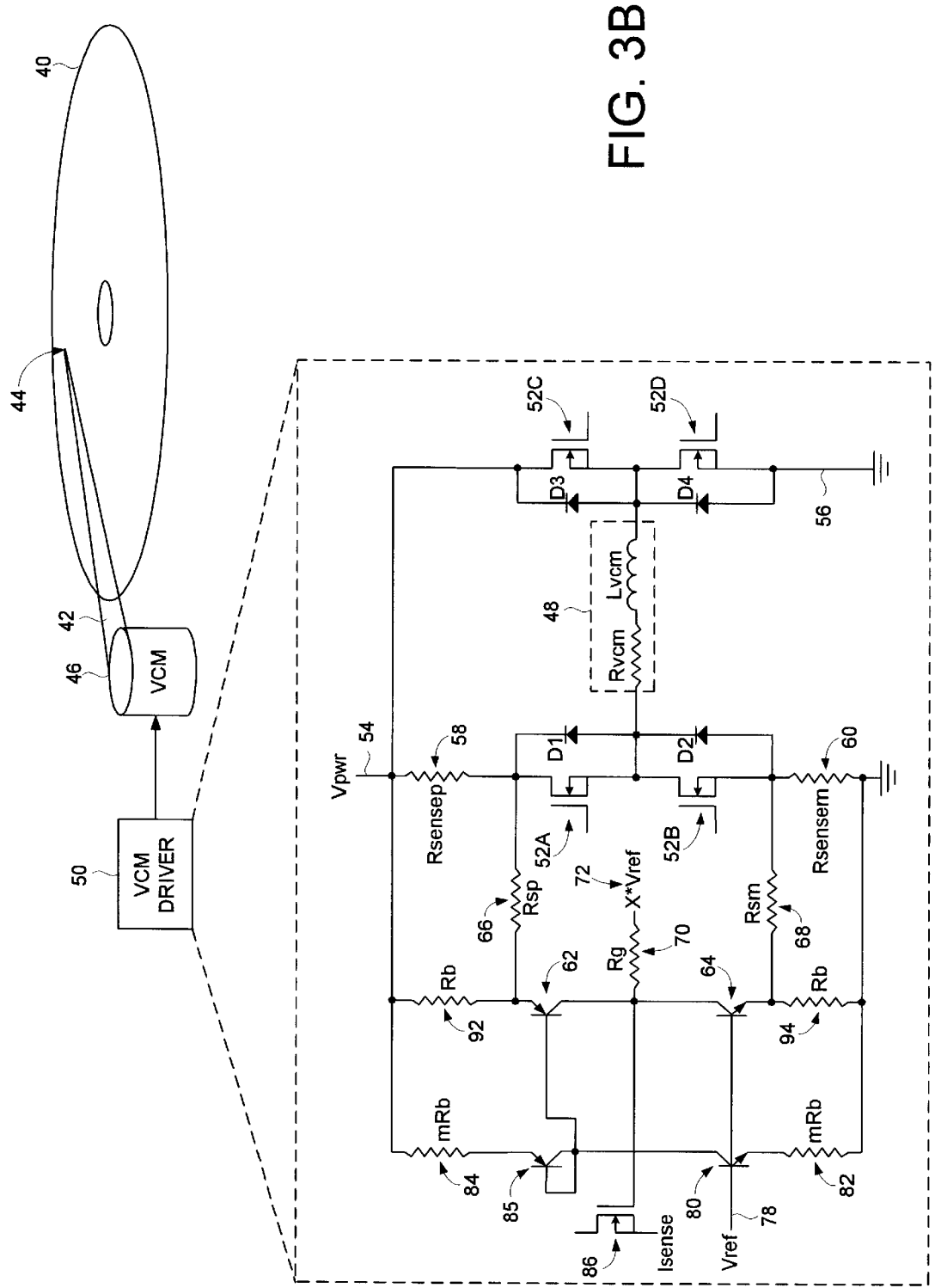
FIG. 3B shows an embodiment of the present invention wherein the first and second current sources of FIG. 3A are implemented using resistors.

FIG. 3A shows an embodiment of the present invention wherein the VCM driver 50 further comprises a first current source 88 for optimizing the operating mode of the first transistor 62, and a second current source 90 for optimizing the operating mode of the second transistor 64. In this embodiment, the current sources 88 and 90 are configured so that the transistors 62 and 64 operate in a more linear region which improves the accuracy and speed of the current sense measurement (the voltage across the gain resistor Rg 70). The first and second current sources 88 and 90 may be implemented using any suitable circuitry, such as conventional current mirror circuits, or as shown in FIG. 3B, by adding resistors 92 and 94. Resistors 92 and 94 can be somewhat mismatched, adding an offset to the voltage across Rg 70, but the AC portion of the current sense signal remains intact.

Figure 4:
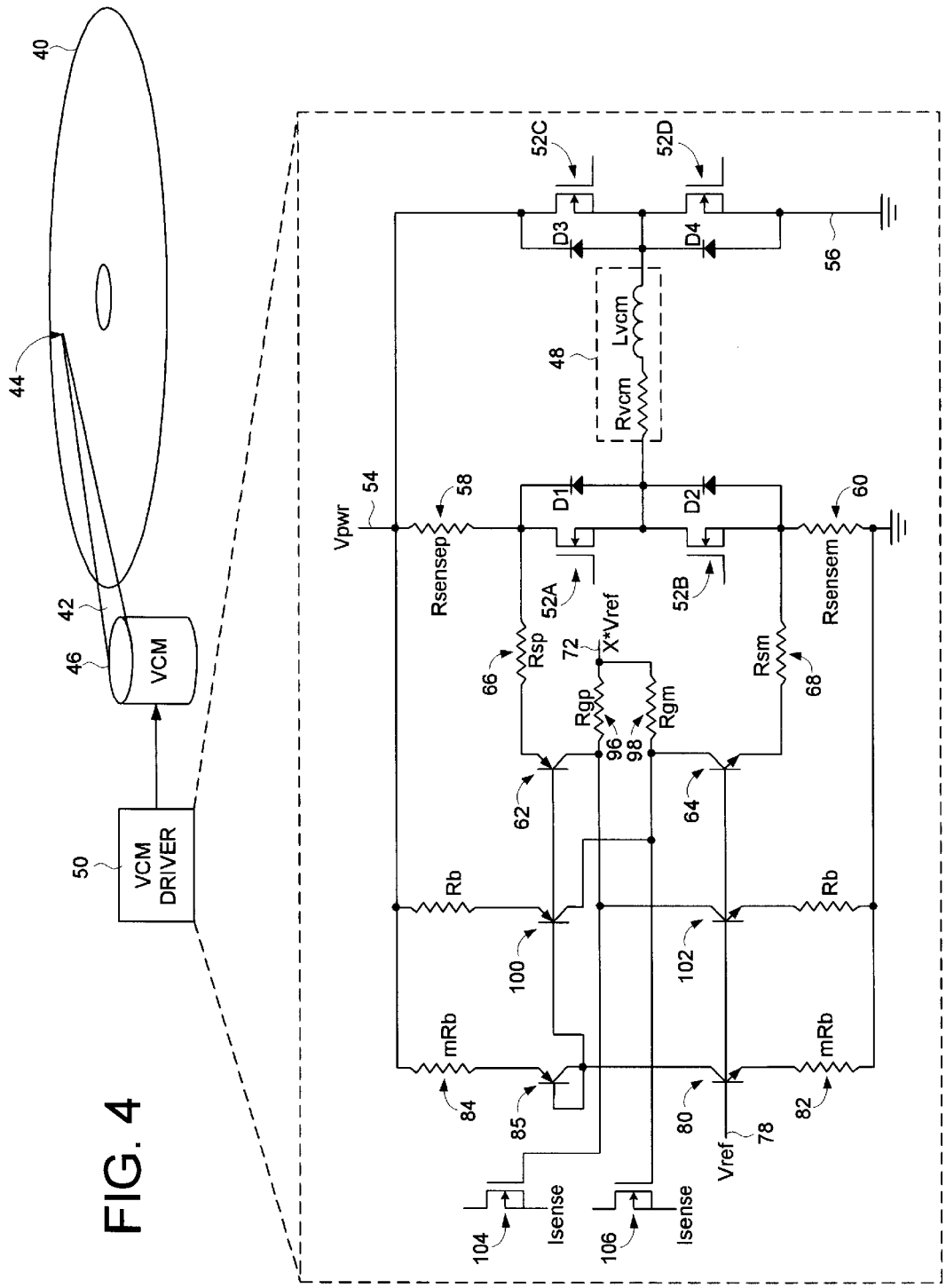
FIG. 4 shows a disk drive according to an embodiment of the present invention wherein the VCM driver further comprises auto-zero circuitry to compensate for drift.

FIG. 4 shows an embodiment of the present invention wherein the VCM driver 50 comprises auto-zero circuitry to compensate for drift in the operating characteristics of the first and second transistors 62 and 64 (due, for example, to temperature drift or component mismatches). This embodiment employs first and second gain resistor Rgp 96 and Rgm 98 for generating a voltage with respect to X*Vref 72 representing the current flowing through the voice coil 48. Transistors 100 and 102 have been added to provide bias currents to transistors 64 and 62, respectively. Resistor Rb is approximately equal to sense resistors Rsp 66 and Rsm 68, nominally zeroing the voltage across gain resistors Rgp 96 and Rgm 98 when zero current flows in the H-bridge.

When driving the VCM 46 in a particular direction (e.g., moving the head 44 from the inner diameter toward the outer diameter of disk 40), the PWM signal turns on driver switches 52A and 52D. Current flowing from the supply voltage 54 through the voice coil 48 to ground 56 generates a voltage drop across sense resistor Rsensep 58 which reduces the voltage across sense resistor Rsp 66 and therefore reduces the amount of current flowing through transistor 62. Since the current flowing through transistor 102 does not change, the gain resistor Rgp 96 sources the difference in current from the reference voltage X*Vref 72 and the voltage developed across the gain resistor Rgp 96 represents the current flowing through the voice coil 48. When the PWM signal turns off driver switches 52A and 52D and turns on driver switch 52B and 52C, current is forced by the inductance to flow from ground, through sense resistor Rsensem 60, through driver switch 52B, through the voice coil 48, through driver switch 52C to the supply voltage 54. This flow generates a voltage drop below ground across sense resistor Rsensem 60 which increases the voltage across sense resistor Rsm 68 and therefore increases the amount of current flowing through transistor 64. Since the current flowing through transistor 100 does not change, the gain resistor Rgm 98 sources the difference in current from the reference voltage X*Vref 72 and the voltage developed across the gain resistor Rgm 98 represents the current flowing through the voice coil 48.

When driving the VCM 46 in the opposite direction (e.g., moving the head 44 from the outer diameter toward the inner diameter of disk 40), the PWM signal turns on driver switches 52C and 52B. Current flowing from the supply voltage 54 through the voice coil 48 to ground 56 generates a voltage across sense resistor Rsensem 60 which reduces the voltage across sense resistor Rsm 68 and therefore reduces the amount of current flowing through transistor 64. Since the current flowing through transistor 100 does not change, the gain resistor Rgm 98 sinks the difference in current and the voltage developed across the gain resistor Rgm 98 represents the current flowing through the voice coil 48. When the PWM signal turns off driver switches 52C and 52B and turns on driver switch 52A and 52D, current is forced by the inductance to flow from ground, through driver switch 52D, through the voice coil 48, through driver switch 52A, through sense resistor Rsensep 58 to the supply voltage 54. This flow generates a voltage rise above the supply voltage 54 across sense resistor Rsensep 58 which increases the voltage across sense resistor Rsp 66 and therefore increases the amount of current flowing through transistor 62. Since the current flowing through transistor 102 does not change, the gain resistor Rgp 96 sinks the difference in current and the voltage developed across the gain resistor Rgp 96 represents the current flowing through the voice coil 48.

A first and second MOSFETs 104 and 106 are used to buffer the respective voltages across the gain resistors Rgp 96 and Rgm 98 representing the current flowing through the voice coil 48.

Since the driver switches 52A–52D in the H-bridge driver are driven with a PWM signal, there is a known period of time during the PWM cycle when zero current is flowing through sense resistor Rsensep 58 and a known period of time when zero current is flowing through sense resistor Rsensem 60. The voltage across the gain resistors Rgp 96 and Rgm 98 during these time intervals, which represents zero current, is used to adjust the voltage measurements when current is flowing through the gain resistors Rgp 96 and Rgm 98. This auto-zero cycle compensates for drift in the operating characteristics of the entire sense circuit. It also allows the use of crude depletion mode MOSFETs 104 and 106 that need not be matched since the auto-zero cycle calibrates out the voltage difference.

Figure 5:
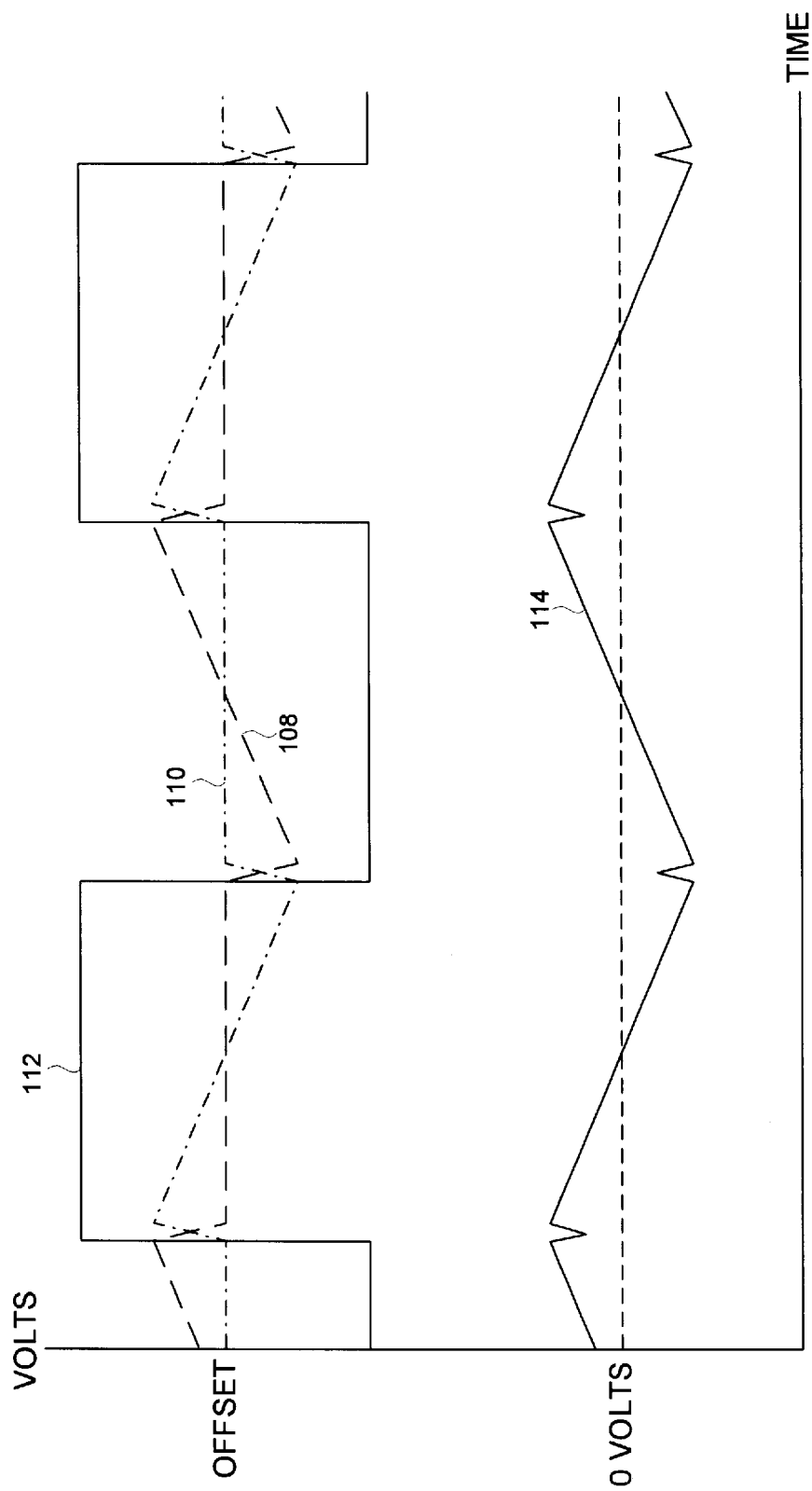
FIG. 5 shows voltage waveforms representing the current sense signals relative to the PWM signal controlling the driver switches.

FIG. 5 shows the voltage waveforms 108 and 110 across gain resistors Rgp 96 and Rgm 98 relative the PWM signal 112 controlling the driver switches 52A–52D. The waveforms illustrate that the operating characteristics of transistors 62 and 64 may drift creating an offset in the voltage measurement across the gain resistors Rgp 96 and Rgm 98. In this example when the PWM signal 112 is high, driver switches 52B and 52C are turned on and driver switches 52A and 52D are turned off. Zero current flows through sense resistor Rsensep 58 such that the voltage 108 across gain resistor Rgp 96 represents the zero-level offset voltage, while the voltage 110 across gain resistor Rgm 98 represents the zero-level offset voltage plus the current flowing through the voice coil 48. When the PWM signal 112 is low, driver switches 52A and 52D are turned on and driver switches 52B and 52C are turned off. Zero current flows through sense resistor Rsensem 60 such that the voltage 110 across gain resistor Rgm 98 represents the zero-level offset voltage, while the voltage 108 across gain resistor Rgp 96 represents the zero-level offset voltage plus the current flowing through the voice coil 48. The voltage 108 across gain resistor Rgp 96 while the PWM signal 112 is high is subtracted from the voltage 108 across gain resistor Rgp 96 while the PWM signal 112 is low. Similarly, the voltage 110 across the gain resistor Rgm 98 while the PWM signal 112 is low is subtracted from the voltage 110 across the gain resistor Rgm 98 while the PWM signal 112 is high. The resulting composite signal 114 represents the current following through the voice coil 48 with the offset voltage canceled. Any suitable circuitry may be employed to subtract the offset from voltages 108 and 110, including sample/hold circuitry operating relative to the PWM cycle. In an alternative embodiment, oscillators and counters are used to subtract the offset from voltages 108 and 110 as disclosed in the above-referenced U.S. patent application entitled "DISK DRIVE COMPRISING OSCILLATORS AND COUNTERS FOR SENSING CURRENT IN A VOICE COIL MOTOR".

Figure 6:
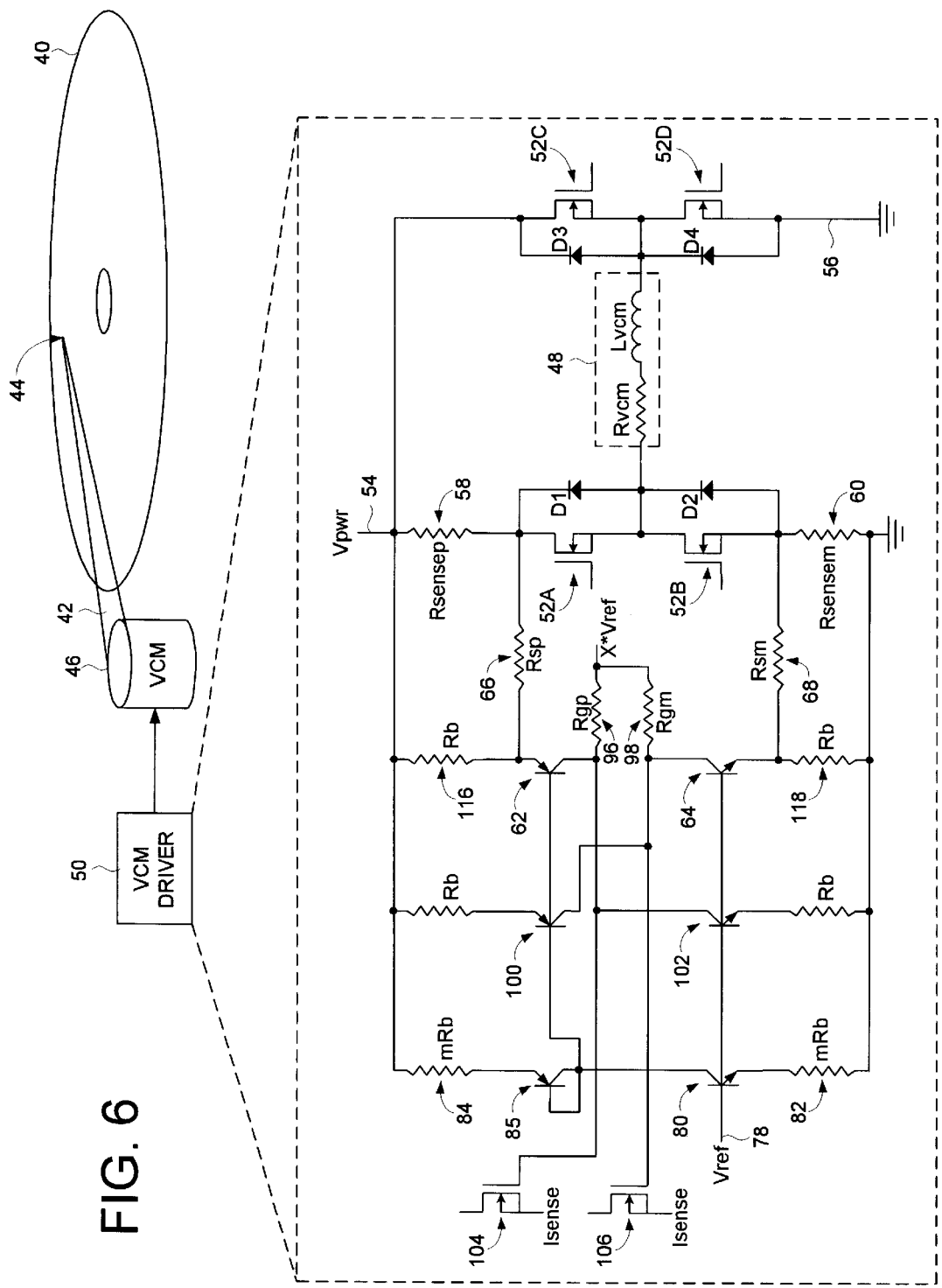
FIG. 6 shows a disk drive according to an embodiment of the present invention wherein the VCM driver comprises auto-zero circuitry and a first and second current source for optimizing the operating mode of the first and second transistors.

FIG. 6 shows an embodiment wherein separate bias current adjustments are included by adding resistors 116 and 118 in order to optimize the operating mode (improve linearity and speed) of the first and second transistors 62 and 64 by increasing the idle current and thus reducing the transistor's internal impedances.

Any suitable transistor technology may be employed to implement transistors 62, 64, 100, 85, 102 and 80. In the embodiments described above, the first and second transistors are bipolar junction transistors (BJT) wherein the first transistor 62 is a pnp BJT and the second transistor 64 is a npn BJT. In an alternative embodiment, the first and second transistors 62 and 64 comprise field effect transistors (FETs). Since the first and second transistors 62 and 64 are emitter (or source) driven, the current sense circuitry operates extremely fast (high bandwidth) with high fidelity.

I claim:

1. A disk drive comprising:
   (a) a disk;
   (b) an actuator arm;
   (c) a head connected to a distal end of the actuator arm;
   (d) a voice coil motor (VCM) comprising a voice coil, the VCM for rotating the actuator arm about a pivot to actuate the head radially over the disk; and
   (e) a VCM driver comprising:
      an H-bridge driver comprising a plurality of driver switches for driving current from a supply voltage through the voice coil to ground;
      a first sense resistor-connected in series between the supply voltage and at least one of the driver switches;
      a second sense resistor connected in series between at least one of the driver switches and ground;
      a first transistor having a first transistor terminal, a second transistor terminal, and a gate terminal;
      a second transistor having a first transistor terminal, a second transistor terminal, and a gate terminal;
      a third sense resistor having a first end connected to a node between the first sense resistor and the at least one of the driver switches and a second end connected to the first transistor terminal of the first transistor;
      a fourth sense resistor having a first end connected to a node between the second sense resistor and the at least one of the driver switches and a second end connected to the first transistor terminal of the second transistor;
      a first gain resistor having a first end and a second end, wherein:
         the first end is connected to at least the second transistor terminal of the first transistor;
         the second end connected to a reference voltage; and
         when the gate terminals of the first and second transistors are forward biased, a voltage across the gain resistor represents the current flowing through the voice coil.

2. The disk drive as recited in claim 1, wherein the VCM driver further comprises a current source for generating a current flowing through the first transistor.

3. The disk drive as recited in claim 2, wherein the current source comprises a resistor having a first end connected to the supply voltage and a second end connected to the first transistor terminal of the first transistor.

4. The disk drive as recited in claim 1, wherein the VCM driver further comprises a current source for generating a current flowing through the second transistor.

5. The disk drive as recited in claim 4, wherein the current source comprises a resistor having a first end connected to the first transistor terminal of the second transistor and a second end connected to ground.

6. The disk drive as recited in claim 1, wherein the first and second transistors are bipolar junction transistors.

7. The disk drive as recited in claim 1, wherein the first and second transistors are field effect transistors.

8. The disk drive as recited in claim 1, wherein the VCM driver further comprises a second gain resistor having a first end and a second end, wherein:

the first end is connected to the second transistor terminal of the second transistor;

the second end is connected to the reference voltage; and when the gate terminals of the first and second transistors are forward biased a voltage across the second gain resistor represents the current flowing through the voice coil.

* * * * *